United States Patent
Leeson et al.

(10) Patent No.: US 11,397,300 B2
(45) Date of Patent: Jul. 26, 2022

(54) ENCLOSURE BOX FOR FIBER OPTIC CABLE

(71) Applicant: PPC BROADBAND FIBER LTD., Framlingham (GB)

(72) Inventors: Kim Leeson, Ipswich (GB); Shaun Trezise, Aldeburgh (GB); Harvey Etheridge, Norfolk (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 16/893,278

(22) Filed: Jun. 4, 2020

(65) Prior Publication Data
US 2020/0386965 A1 Dec. 10, 2020

Related U.S. Application Data

(60) Provisional application No. 62/857,208, filed on Jun. 4, 2019.

(51) Int. Cl.
*G02B 6/44* (2006.01)

(52) U.S. Cl.
CPC ......... *G02B 6/4441* (2013.01); *G02B 6/4457* (2013.01); *G02B 6/4471* (2013.01)

(58) Field of Classification Search
CPC .. G02B 6/4441; G02B 6/4457; G02B 6/4466; G02B 6/4471
(Continued)

(56) References Cited

U.S. PATENT DOCUMENTS

2007/0111814 A1* 5/2007 Cheng .................... A63B 53/10
473/300
2007/0274659 A1 11/2007 Kaplan
(Continued)

FOREIGN PATENT DOCUMENTS

| EP | 2230738 A2 | 9/2010 |
| EP | 2993750 A2 | 3/2016 |
| EP | 3229054 A2 | 10/2017 |

OTHER PUBLICATIONS

Fibrain Sp. Z O.O. "Installing Instruction of Customer Outlet VFTO-E1 With Preconnectorized Abonent Cable in the Rapid Box Carton", Feb. 22, 2018, retrieved from the internet: URL:https//distribution.fribrain.com/produkt/customer-outlet-vfto-e1,611.html [retrieved on Aug. 24, 2020], pp. 5-6.
(Continued)

*Primary Examiner* — Michael P Mooney
(74) *Attorney, Agent, or Firm* — MH2 Technology Law Group LLP (57) ABSTRACT

An enclosure box assembly for fiber optic cable includes an enclosure box, a backplate, a preterminated fiber optic drop cable preinstalled with the enclosure box, and a fiber optic adapter preinstalled with the enclosure box and optically connected with the fiber optic drop cable. The backplate includes a plurality of latches that are configured to interlock with a complementary latching structure on the enclosure box, and a plurality of slotted countersunk screw holes configured to receive screws for attaching the backplate to a support structure. The backplate includes a first exit opening through a middle portion of the backplate, a second exit opening at a top end of the backplate, and a third exit opening at a bottom end of the backplate.

30 Claims, 7 Drawing Sheets

(58) Field of Classification Search
USPC .......................................................... 385/135
See application file for complete search history.

(56) References Cited

U.S. PATENT DOCUMENTS

2013/0287358 A1    10/2013   Alston et al.
2021/0173162 A1*    6/2021   Haile-Mariam ..... G02B 6/4441

OTHER PUBLICATIONS

Diamond SA et al.: "Diamond Flexos Fiber Optic Passive Components FTTH Box", Internet Citation, Feb. 1, 2010, p. 1, XP002636489, retrieved from the Internet: URL:www.diamond-fo.com/media/products/datasheets/FTTH_Box_e.pdf [retrieved on May 9, 2011], the whole document.
International Search Report and Written Opinion dated Sep. 11, 2020 in corresponding PCT Application No. PCT/US2020/036181 (Authorized Officer, Leander Hohmann), 16 pages.

* cited by examiner

ENCLOSURE BOX FOR FIBER OPTIC CABLE

CROSS-REFERENCE TO RELATED APPLICATION

This nonprovisional application claims the benefit of U.S. Provisional Application No. 62/857,208, filed Jun. 4, 2019. The disclosure of the prior application is hereby incorporated by reference herein in its entirety.

TECHNICAL FIELD

This disclosure relates generally to the field of apparatuses for the installation of optical fiber networks. In particular, this disclosure relates to an enclosure box for fiber optic cable and, more particularly, to a customer terminal enclosure box that serves as a termination point for fiber to the home deployments.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTP or FTTH network typically includes a fiber distribution hub (FDH), which is typically located in the basement or vault of a multi-dwelling unit building in which the end users reside. A multi-fiber distribution cable typically leads out of the distribution hub to a fiber connection point that is typically located remote from the distribution hub. At the distribution hub, the distribution cable can be connected optically to one or more drop cables. As used herein, a "drop cable" is an optical fiber cable that typically runs between the distribution hub and an apartment or office of an end user. To connect the distribution cable to the drop cables, a number of optical fibers are broken out of the distribution cable and into a same number of single-fiber cables that are each terminated with an optical fiber connector. Each drop cable is then typically terminated at a customer terminal enclosure box, for example, a small customer terminal (SCT), located in the proximity of or inside an apartment or office of an end user. A building may include a single FDH for the entire building, or one FDH per floor, or any combination in between, depending on the fiber connection needs and capacity of the building.

In some installations, an appropriate length of a preterminated optical fiber drop cable is fed from the FDH to the SCT, and in other installations, the preterminated drop cable is fed from the SCT to the FDH. In either case, the FDH and/or the SCT may be configured to accommodate a slack length of the drop cable when necessary.

Figure 7:
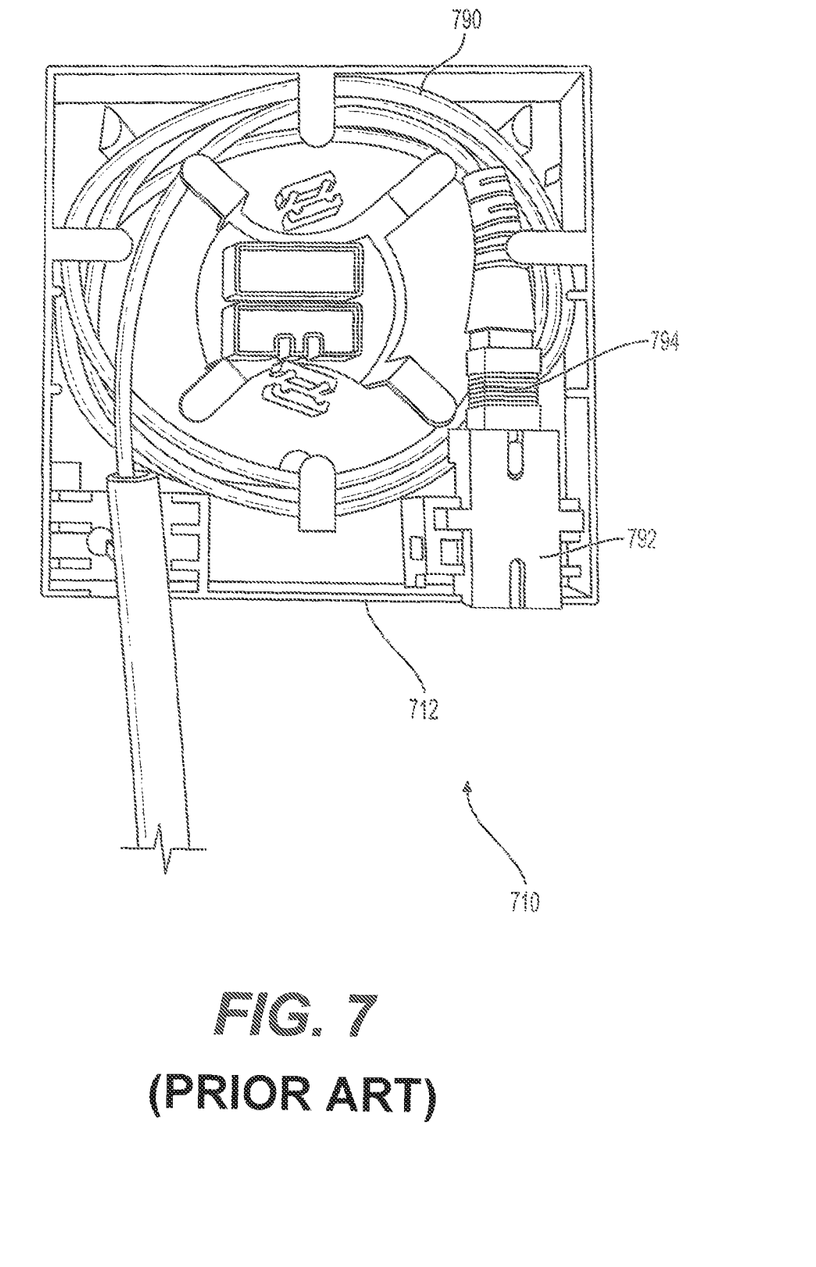
FIG. 7 is a front view of a conventional small customer terminal assembly.

Some conventional SCTs, such as the exemplary SCT 710 shown in FIG. 7, are provided with a preinstalled and preterminated cable 790 and an adapter 792 configured to couple a preterminated end 794 of the cable 790 with another cable (not shown) that is coupled to the opposite side of the adapter and runs to the end user's Optical Network Terminal (ONT). The SCT 710 includes a base member 712 that is configured to be mounted directly to a wall. In order to secure the base member 712 to the wall, a removable cover (not shown) is removed from the base member 712 and the preinstalled cable is removed to allow access to the mounting features. This lengthens the process for installing the SCT 710 and risks damaging components of the SCT, such as the fiber, the connector, and/or the adapter, when the cable is removed during mounting.

Therefore, it may be desirable to provide an SCT assembly that permits an SCT to be installed to a wall without accessing an interior of the SCT and without removing preinstalled cable and/or other components. It may also be desirable to provide an SCT assembly that provides multiple exit options from the SCT for the drop cable.

SUMMARY

According to various embodiments of the disclosure, an enclosure box assembly for fiber optic cable includes an enclosure box, a backplate, a preterminated fiber optic drop cable preinstalled with the enclosure box, and a fiber optic adapter preinstalled with the enclosure box and optically connected with the fiber optic drop cable. The backplate includes a plurality of latches that are configured to interlock with a complementary latching structure on the enclosure box, a plurality of slotted countersunk screw holes configured to receive screws for attaching the backplate to a support structure, and a first exit opening through a middle portion of the backplate, a second exit opening at a top end of the backplate, and a third exit opening at a bottom end of the backplate. The enclosure box is configured to be coupled with the backplate without twisting or turning the enclosure box relative to the backplate to assemble the enclosure box assembly, and the latches and the complementary latching structure are configured to prevent the enclosure box from being removed from the backplate once attached thereto. The second and third exit openings permit a drop cable to be fed through one the second and third exit openings between the enclosure box and the backplate when the enclosure is attached to the backplate and secured via the latches.

In some aspects, an enclosure box install kit includes a box containing a reel, the aforementioned enclosure box assembly, and a tray containing the enclosure box and the backplate. The fiber optic drop cable is wound on the reel. According to various aspects, the enclosure box install kit includes a cover configured to cover the tray to contain the enclosure box and the backplate in the tray.

In accordance with various embodiments of the disclosure, an enclosure box assembly for fiber optic cable includes an enclosure box, a backplate, a preterminated fiber optic drop cable preinstalled with the enclosure box, and a fiber optic adapter preinstalled with the enclosure box and optically connected with the fiber optic drop cable. The backplate includes a plurality of latches that are configured to interlock with a complementary latching structure on the enclosure box, and a plurality of slotted countersunk screw holes configured to receive screws for attaching the backplate to a support structure. The backplate includes a first exit opening through a middle portion of the backplate, a second exit opening at a top end of the backplate, and a third exit opening at a bottom end of the backplate.

In some embodiments, the enclosure box is configured to be coupled with the backplate without twisting or turning the enclosure box relative to the backplate to assemble the enclosure box assembly.

In various embodiments, the latches are configured as cantilevered arms that extend from a front surface of the backplate and include a finger at the free end of the arms.

According to some embodiments, the latches and the complementary latching structure are configured to prevent the enclosure box from being removed from the backplate once attached thereto.

According to various aspects, the enclosure box is a small customer terminal.

In some embodiments, the second and third exit openings permit a drop cable to be fed through one the second and third exit openings between the enclosure box and the backplate when the enclosure is attached to the backplate and secured via the latches.

In various embodiments, the enclosure includes a front wall, a bottom wall, a top wall, two side walls, and a back wall. According to some aspects, the front wall, the bottom wall, the top wall, the two side walls, and the back wall are a monolithic structure of unitary construction such that the front wall is not removable from the walls.

According to some embodiments, the enclosure box includes first and second wrap guides arranged to direct slack of the fiber optic cable to follow an arcuate path that is greater than or equal to a minimum bend radius of the fiber optic cable.

According to various embodiments, a front surface of the backplate includes a pair of opposed contoured walls formed by raised ribs extending from the front surface of the backplate on opposite sides of the first opening and extending from the top end of the backplate to the bottom end of the backplate. In some aspects, the walls converge toward one another but are spaced apart from one another at the top end and the bottom end of the backplate to define the second opening and the third opening.

In accordance with some aspects of the disclosure, an enclosure box assembly for fiber optic cable includes an enclosure box and a backplate. The enclosure box houses a preterminated fiber optic drop cable preinstalled with the enclosure box and a fiber optic adapter preinstalled within the enclosure box and optically connected with the fiber optic drop cable. The enclosure box is configured to be fixedly coupled with the backplate after the backplate is attached to a support structure, and the backplate includes at least one exit opening configured to permit the drop cable to be pass there through.

According to various embodiments of the disclosure, an enclosure box install kit includes a box containing a reel and the enclosure box assembly according to one of the aforementioned embodiments and a tray containing the enclosure box and the backplate. The fiber optic drop cable is wound on the reel.

According to some embodiments, a cover is configured to cover the tray to contain the enclosure box and the backplate in the tray.

BRIEF DESCRIPTION OF THE FIGURES

For a further understanding of the invention, reference will be made to the following detailed description of the invention which is to be read in connection with the accompanying drawing and in which like numbers refer to like parts, wherein.

DETAILED DESCRIPTION

As a preface to the detailed description, it should be noted that, as used in this specification and the appended claims, the singular forms "a", "an" and "the" include plural referents, unless the context clearly dictates otherwise.

FIGS. 1-3B illustrate an exemplary enclosure box assembly or SCT assembly 100 in accordance with various aspects of the disclosure. The SCT assembly 100 includes a customer terminal enclosure box or SCT 110 and a backplate 120. In some aspects, the backplate 120 includes a plurality of latches 122 that are configured to interlock with a complementary latching structure (not shown) on the SCT 110 such that the SCT 110 is configured to be coupled with the backplate 120 without twisting or turning the SCT 110 relative to the backplate 120 to assemble. In other words, the SCT 110 is pushed toward the backplate 120 to couple the latches 122 with the complementary latching structure. It should be appreciated that the latches 122 may be configured as cantilevered arms 124 that extend from a front surface 128 of the backplate and include a finger 126 at the free end of the arms 124. It should be appreciated that the complementary latching structure may be any conventional latching structure configured to interlock with the latches 122 without twisting or turning the SCT 110 relative to the backplate 120 to assemble. The latches 122 and complementary latching structure may be configured to prevent the SCT 110 from being removed from the backplate 120 once attached thereto. In some aspects, the latches 122 may be plastic, such as a thermoplastic polymer, for example, acrylonitrile butadiene styrene (ABS).

Figure 2:
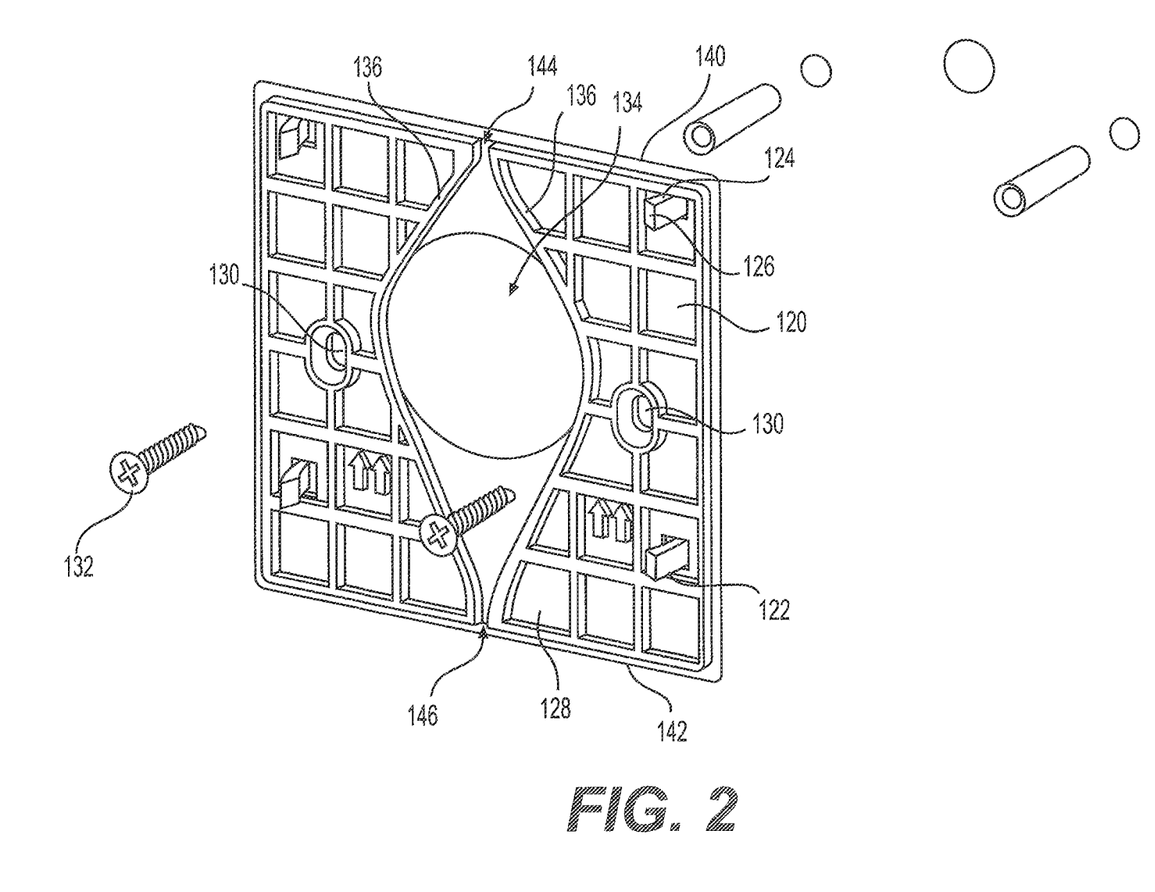
FIG. 2 is a perspective view of a backplate of the exemplary small customer terminal assembly of FIG. 1.

As best shown in FIG. 2, the backplate 120 may include a plurality of slotted countersunk screw holes 130 configured to receive screws 132 for attaching the backplate 120 to a wall. The screws 132 may be screwed into studs or anchors configured to receive the screws, as would be understood by persons of ordinary skill in the art.

The backplate 120 includes an opening 134 through a middle portion of the backplate 120. The opening 134 is sufficiently sized to feed a drop cable through an opening in the wall behind the backplate 120 that is aligned with the opening 134. The front surface 128 of the backplate 120 includes a pair of opposed contoured walls 136 formed on opposite sides of the opening 134 and extending from a top end 140 of the backplate 120 to a bottom end 142 of the backplate 120. As shown, the walls 136 are spaced farthest apart from one another near in the middle of the backplate 120 and converge toward one another, but are spaced apart from one another at the top end 140 and the bottom end 142 of the backplate 120 to define a top exit opening 144 and a bottom exit opening 146. The walls 136 may be formed by raised ribs extending from the front surface 128 of the backplate 120. When the SCT 110 is attached to the backplate 120 and secured via the latches 122, the top and bottom exit openings 144, 146 permit a drop cable to be fed through either one the openings 144, 146 between the SCT 110 and the backplate 120.

Figure 1:
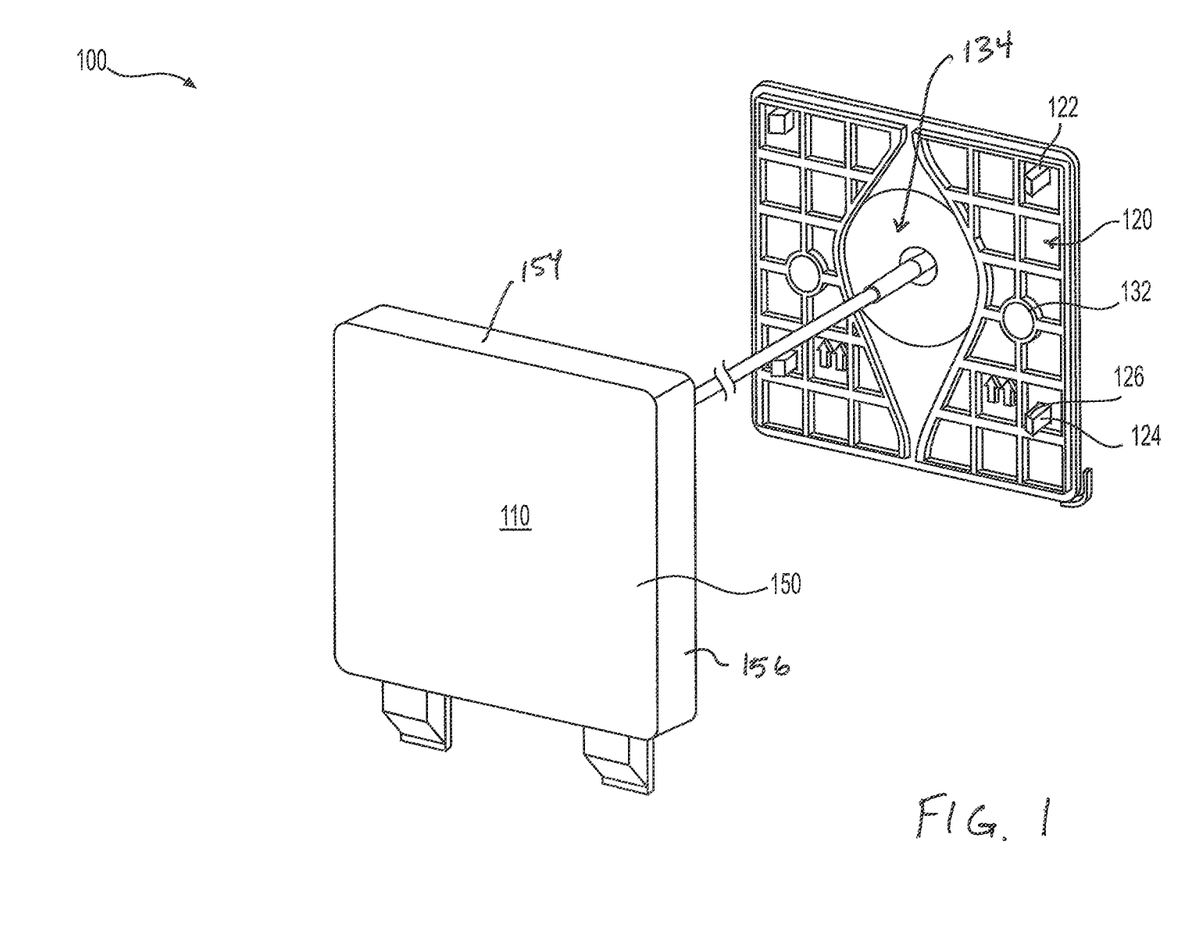
FIG. 1 is an exploded perspective view of an exemplary small customer terminal assembly in accordance with various aspects of the disclosure.
Figure 3A:
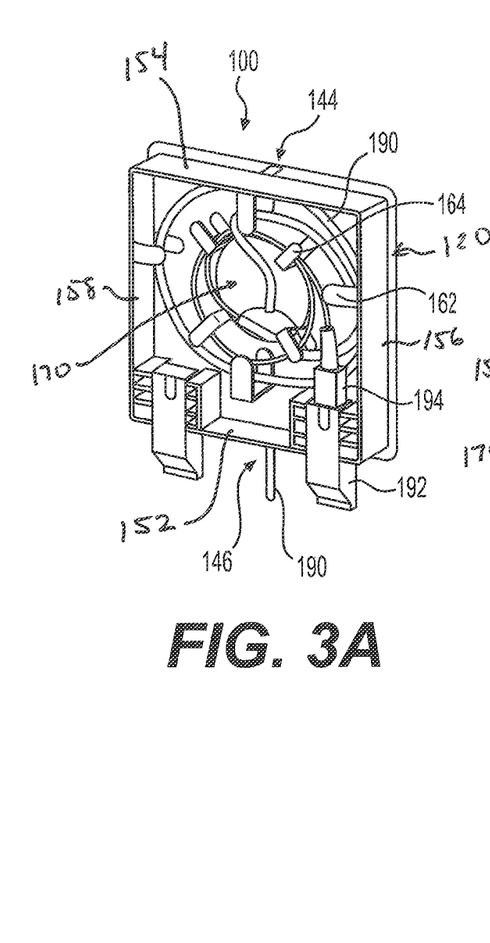
FIGS. 3A-3C are cutaway views of the exemplary small customer terminal assembly of FIG. 1 is three installation configurations.
Figure 3B:
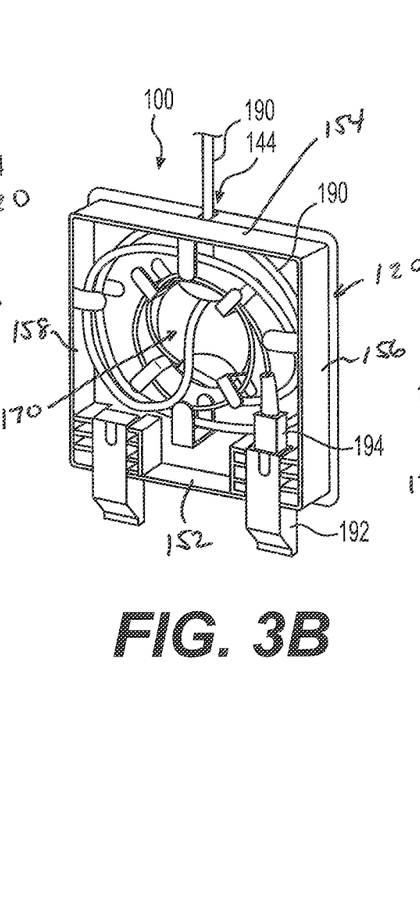
Figure 3C:
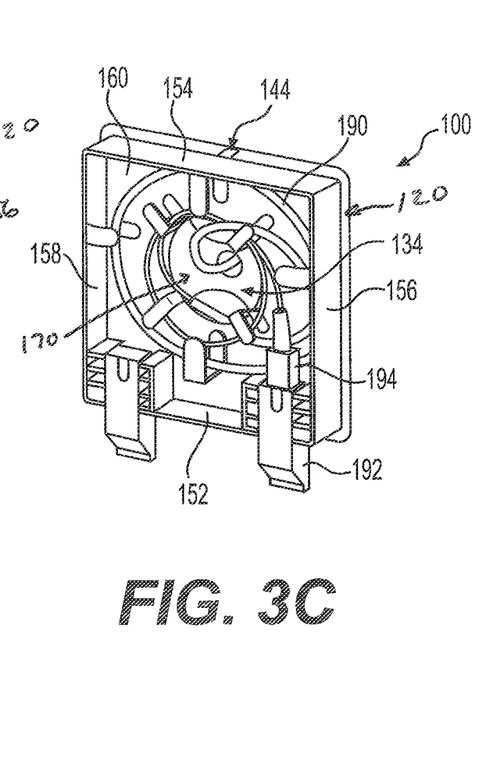

As shown in FIG. 1, the SCT 110 may provide a housing that houses a preinstalled and preterminated drop cable such that an interior chamber of the housing is not accessible during normal use of the SCT 110. For example, as illustrated in FIG. 1, the front wall 150 of the SCT 110 is integral with the sidewalls of the SCT 110. Referring now to FIGS. 3A-3C, which shows a cutaway view of the SCT 110 with the front wall 150 removed, the SCT may include the front wall 150, a bottom wall 152, a top wall 154, side walls 156, 158, and a back wall 160. In some aspects, the front wall 150, the bottom wall 152, the top wall 154, the side walls 156, 158, and the back wall 160 may be a monolithic structure of unitary construction such that the front wall 150 is not removable from the remaining walls 152-160. In other aspects, the front wall 150 may be configured as a cover that may be separable from the remaining walls 152-160. However, in some aspects of a separable front wall 150, a special keyed tool may be required to remove the front wall 150 in order to avoid unintended access and/or unauthorized access to the interior of the SCT. In such embodiments, the SCT 110 is configured to permit a technician to install the SCT 110 to a wall or surface without having to access the interior of the SCT 110.

Referring again to FIGS. 3A-3C, the SCT 110 includes a preinstalled and preterminated drop cable 190, for example, a preterminated Miniflex® fiber cable, and an adapter 192 configured to couple a preterminated end 194 of the drop cable 190 with another cable (not shown) that can be coupled to the adapter and runs to the end user's Optical Network Terminal (ONT). Although FIGS. 3A-3C illustrate the SCT 110 with two adapters 192, it should be understood that only a single adapter is required and thus the second adapter can be omitted. The adapter 192 may be an SC simplex or LC duplex adapter.

FIGS. 3A-3C illustrate three installation configurations of the SCT assembly 100. FIG. 3A illustrates the drop cable 190 being fed through a center opening 170 of the SCT 110, between the back wall 160 of the SCT and the front surface 128 of the backplate 140, and through the bottom exit opening 146 at the bottom wall 142 of the backplate. FIG. 3B illustrates the drop cable 190 being fed through the center opening 170 of the SCT 110, between the back wall 160 of the SCT and the front surface 128 of the backplate 140, and through the top exit opening 144. FIG. 3C illustrates the drop cable 190 being fed through the center opening 170 of the SCT 110 and through the opening 134 through the middle portion of the backplate 120. In each of these installation configurations, the SCT 110 is arranged such that the adapter 192 is oriented vertically so that the cable (not shown) that runs to the end user's ONT will plug into the adapter 192 at the bottom end 142 of the backplate. Of course, the SCT assembly 100 can be rearranged such that the drop cable 190 can be fed in any desired direction, and the adapter 192 can be oriented in any desired direction.

Referring still to FIGS. 3A-3C, the SCT 110 may include first and second wrap guides 162, 164 are arranged to direct the slack fiber optic cable 191 to follow an arcuate path that is greater than or equal to a minimum bend radius of the fiber optic cable 190. The bend radius of the arcuate path in the storage region of the wrap guides 162, 164 is generally greater than the minimum permissible bend radius of the fiber optic cable 190 in order to prevent signal losses. For example, as the bend radius of an optical fiber or filament decreases below the minimum permissible bend radius, the incident light energy is not fully reflected internally of the optic filament and, thus, light energy is refracted out of the filament causing a portion of the light energy to be absorbed or lost.

Figure 4:
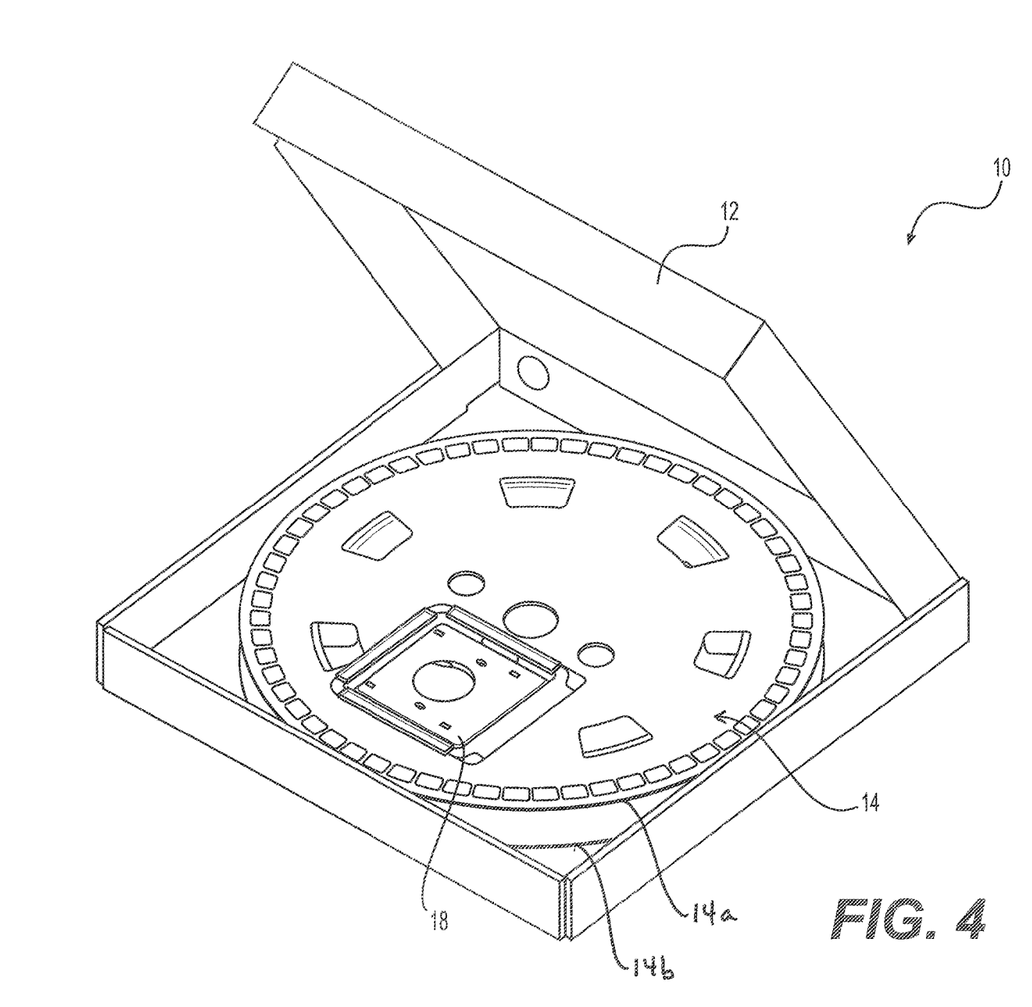
FIG. 4 is a perspective view of an installation kit for the exemplary small customer terminal assembly of FIG. 1.
Figure 5:
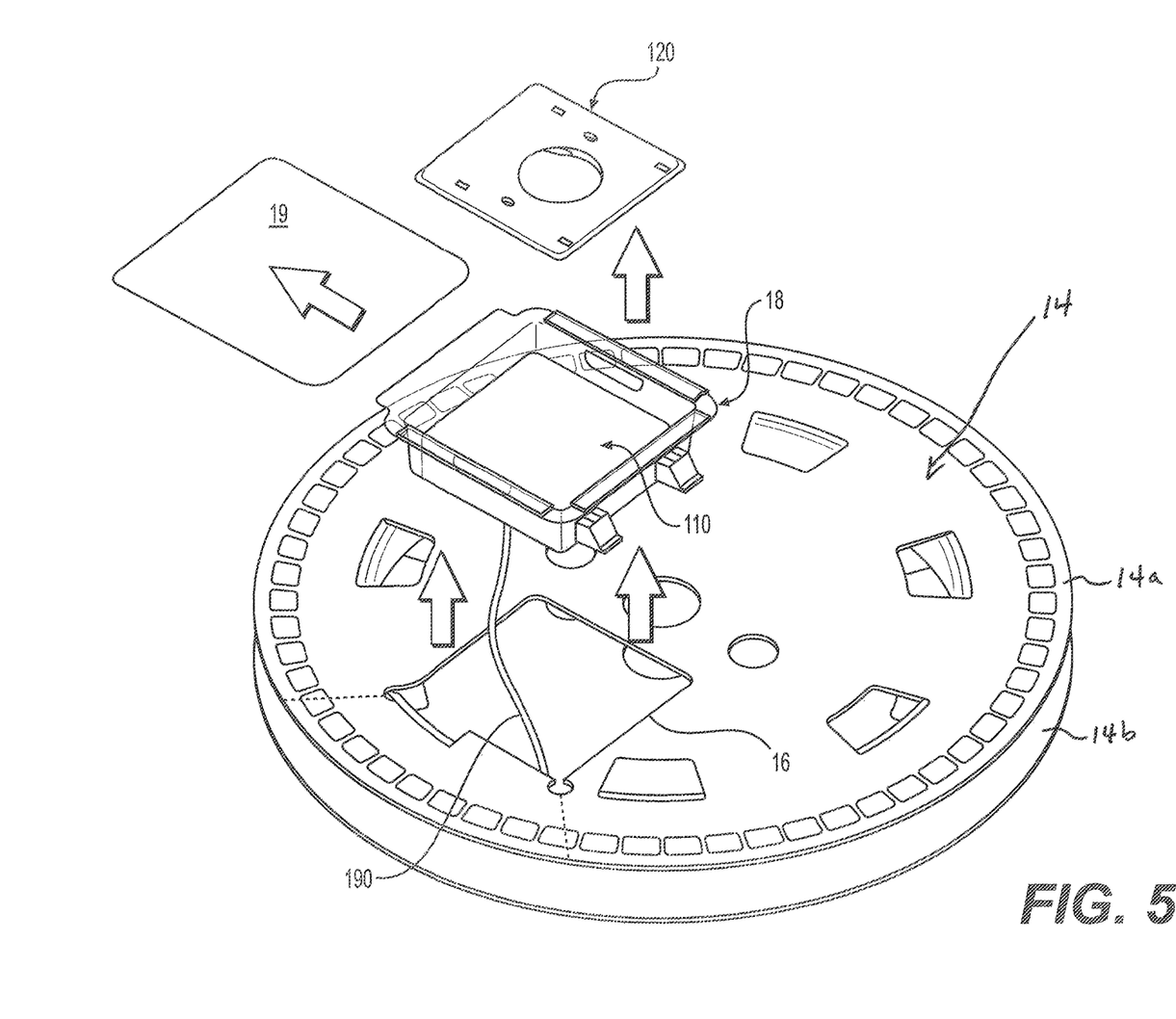
FIG. 5 is an exploded perspective view of the installation kit of FIG. 4.
Figure 6:
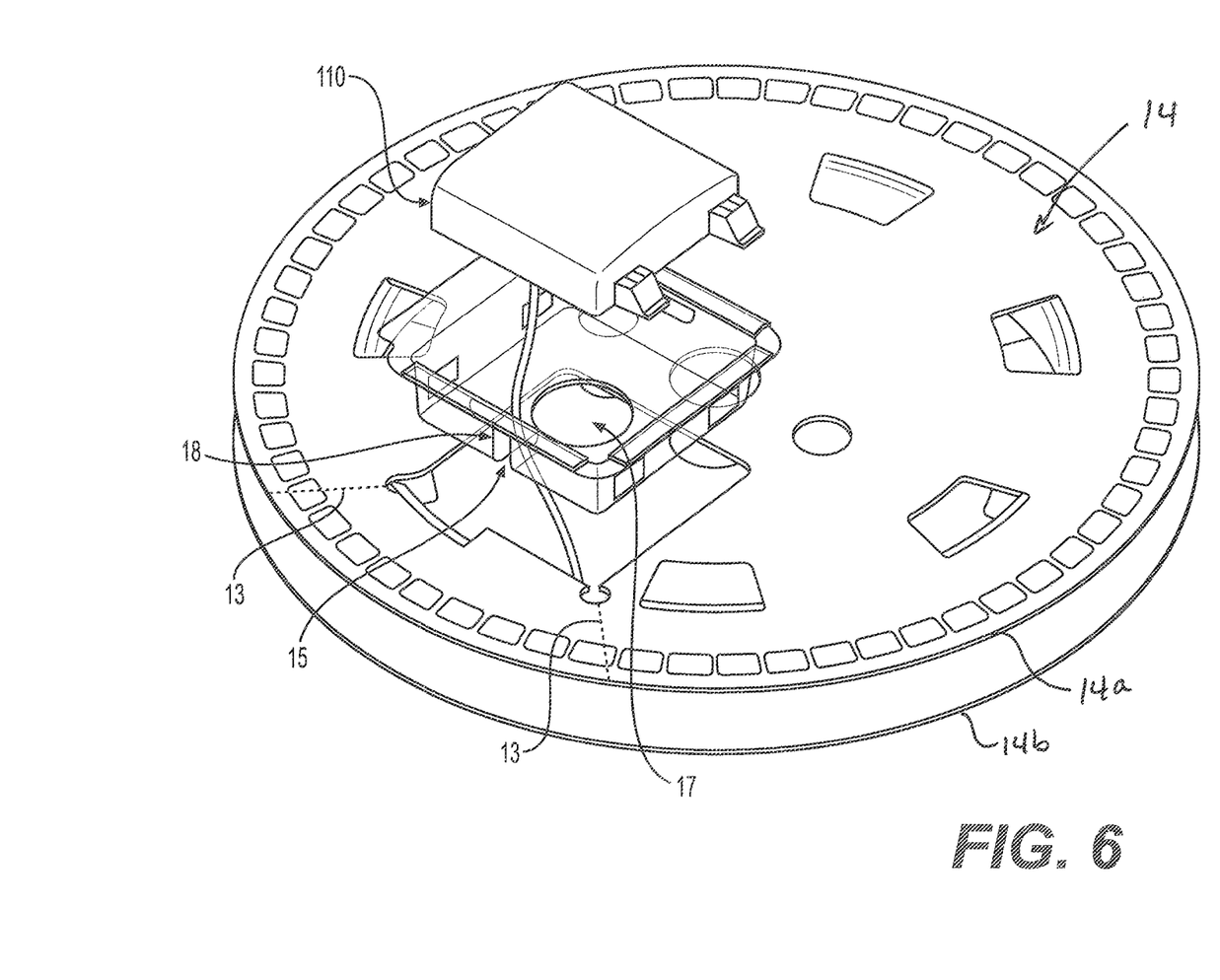
FIG. 6 is another exploded perspective view of the installation kit of FIG. 4.

Referring now to FIGS. 4-6, the SCT assembly 100 may be provided as part of an install kit 10. The install kit 10 includes a box 12 containing a reel 14 having the drop fiber optic cable 190 wound thereon between a pair of reel flanges 14a, 14b. The box 12 may be configured similar to a pizza box. One of the reel flanges 14a includes a cutout 16 configured to receive a removable tray 18. The tray 18 is configured to receive the SCT 110 and the backplate 120. The tray 18 is configured to receive a removable cover 19 that cooperates with the tray 18 to contain and protect the SCT 110 and the backplate 190 during shipping and storage prior to use. The box 12, the reel 14, the tray 18, and the cover 19 may be disposed after the SCT assembly 100 is installed. For example, in some aspects, the box 12 and the reel 14 may be cardboard, and the tray 18 and the cover 19 may be plastic.

As discussed above, the SCT 110 includes the preinstalled and preterminated drop cable 190 and the adapter 192, and a remaining portion of the drop cable 190 that is not contained in the SCT 110 is wound on the reel 14. The adapter 192 (or plurality of adapters) may assist with maintaining the tray 18 in the cutout 16 during shipping and storage. When a technician is ready to install the SCT assembly 100, the reel 14 is removed from the box 12, and the tray 18 is removed from the cutout 16 in the reel 14. The cover 19, if present, is then removed from the tray 18. For example, in some aspects, the tray 18 may include folded-over flaps that form passages to receive the cover 19, and the cover 19 can be slidingly removed from the tray 18 to expose the backplate 120 and the SCT 110. The backplate 120 can be removed from the tray 18, as well as any screws and/or anchors that are provided with the install kit 10.

Because the drop cable 190 is preinstalled with the SCT 110, the portion of the drop cable 190 that is not contained in the SCT 110 extends through an opening 17 in the bottom of the tray 18 to the reel 14, where it is wound thereon. In order for the SCT 110 to be installed, the drop cable 190 has to freed from the tray 18 and the reel 14. For example, in some aspects, a slot 15 can be cut in the tray 18, as shown in FIG. 6, and the reel 14 can be torn along a perforation 13 to provide openings facilitating freeing of the portion of the drop cable 190 that is not contained in the SCT 110. In other aspects, the tray 18 and the reel 14 can include preformed openings for freeing the drop cable 190. In other aspects, the tray 18 and the reel 14 can include weakened portions that can be removed in order to free the drop cable 190.

After the SCT 110 and the backplate 120 are removed from the tray 18 and the drop cable 190 is freed from the tray 18 and the reel 14, the drop cable 190 is paid out from the reel 14. That is, the drop cable 190 includes a second preterminated end (not shown) that is fed to a fiber distribution hub (FDH) where the drop cable 190 is optically connected to a fiber optic network. Then, the backplate 120 is mounted to a wall or other structure by screwing the screws 132 through the slotted countersunk screw holes 130 and to the wall or other structure, and the SCT 110 is attached to the backplate 120 by coupling the latches 122 with the complementary latching structure on the SCT 110.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An enclosure box assembly for fiber optic cable comprising:
    an enclosure box including a front wall, a back wall, a top wall, a bottom wall, and two opposed side walls defining an interior;
    a backplate including a top edge, a bottom edge, and two opposed side edges;
    a preterminated fiber optic drop cable preinstalled with the enclosure box;
    a fiber optic adapter preinstalled with the enclosure box and optically connected with the fiber optic drop cable;
    wherein the fiber optic adapter, a preterminated end of the fiber optic drop cable, and a portion of the fiber optic drop cable are in the interior of the enclosure box;
    wherein the enclosure box is configured to prevent access to the fiber optic adapter, the preterminated end of the fiber optic drop cable, and the portion of the fiber optic drop cable that are in the interior of the enclosure box when the backplate is installed to a surface and to the enclosure box;
    wherein the backplate is a planar member having raised ribs extending from a front surface of the planar member;
    wherein the backplate includes a plurality of latches extending from the front surface of the planar member inward of the top edge, the bottom edge, and the two opposed side edges into the interior of the enclosure box;
    wherein the latches are configured to interlock with a complementary latching structure on the enclosure box;
    wherein the inward location of the latches prevents the latches from being accessible when the latches are interlocked with the latching structure such that the latches and the complementary latching structure are configured to prevent the enclosure box from being removed from the backplate when being attached thereto;
    wherein the backplate includes a plurality of slotted countersunk screw holes configured to receive screws for attaching the backplate to a support structure;
    wherein the backplate includes a first exit opening through a middle portion of the backplate, a second exit opening at a top end of the backplate, and a third exit opening at a bottom end of the backplate;
    wherein the enclosure box is configured to be coupled with the backplate without twisting or turning the enclosure box relative to the backplate to assemble the enclosure box assembly;
    wherein the second and third exit openings permit a drop cable to be fed through one of the second and third exit openings between the enclosure box and the backplate when the enclosure box is attached to the backplate and secured via the latches; and
    wherein the front wall, the back wall, the top wall, the bottom wall, and the two opposed side walls are a monolithic structure of unitary construction such that the front wall is not removable from the bottom wall, the top wall, the two side walls, and the back wall.

2. An enclosure box install kit comprising:
    a box containing a reel and the enclosure box assembly of claim 1;
    a tray containing the enclosure box and the backplate; and
    wherein the fiber optic drop cable is wound on the reel.

3. The enclosure box install kit of claim 2, further comprising a cover configured to cover the tray to contain the enclosure box and the backplate in the tray.

4. An enclosure box assembly for fiber optic cable comprising:
    an enclosure box configured to have an interior that is configured to receive a fiber optic adapter, a preterminated end of a fiber optic drop cable, and a portion of the fiber optic drop cable;
    a backplate configured to be attached to a support structure and to be coupled with the enclosure box;
    a preterminated fiber optic drop cable preinstalled with the enclosure box;
    a fiber optic adapter preinstalled with the enclosure box and optically connected with the fiber optic drop cable;
    wherein the enclosure box is configured to prevent access to the fiber optic adapter, the preterminated end of the fiber optic drop cable, and the portion of the fiber optic drop cable that are in the interior of the enclosure box when the backplate is installed to the support structure and to the enclosure box;
    wherein the backplate includes a plurality of latches that extend into the interior of the enclosure box and are configured to interlock with a complementary latching structure on the enclosure box to secure the enclosure box to the backplate after the backplate is attached to the support structure;
    wherein the location of the latches in the interior of the enclosure box prevents the latches from being accessible when the latches are interlocked with the complementary latching structure such that the latches and the complementary latching structure are configured to prevent the enclosure box from being removed from the backplate when being attached thereto; and
    wherein the backplate includes at least one exit opening configured to permit the drop cable to pass there through.

5. The enclosure box assembly of claim 4, wherein the enclosure box is configured to be coupled with the backplate without twisting or turning the enclosure box relative to the backplate to assemble the enclosure box assembly.

6. The enclosure box assembly of claim 4, wherein the latches are configured as cantilevered arms that extend from a front surface of the backplate and include a finger at the free end of the arms.

7. The enclosure box assembly of claim 4, wherein the enclosure box is a small customer terminal.

8. The enclosure box assembly of claim 4, wherein at least one opening permits a drop cable to pass between the enclosure box and the backplate when the enclosure box is attached to the backplate and secured via the latches.

9. The enclosure box assembly of claim 4, wherein the enclosure box includes a front wall, a bottom wall, a top wall, two side walls, and a back wall.

10. The enclosure box assembly of claim 9, wherein the front wall, the bottom wall, the top wall, the two side walls, and the back wall are a monolithic structure of unitary construction such that the front wall is not removable from the bottom wall, the top wall, the two side walls, and the back wall.

11. The enclosure box assembly of claim 4, wherein the enclosure box includes first and second wrap guides arranged to direct slack of the fiber optic cable to follow an arcuate path that is greater than or equal to a minimum bend radius of the fiber optic cable.

12. The enclosure box assembly of claim 4, wherein a front surface of the backplate includes a pair of opposed contoured walls formed by raised ribs extending from the front surface of the backplate on opposite sides of a first opening of the at least one opening and extending from the top end of the backplate to the bottom end of the backplate.

13. The enclosure box assembly of claim 12, wherein the walls converge toward one another but are spaced apart from one another at the top end and the bottom end of the backplate to define the two additional openings of the at least one opening.

14. An enclosure box install kit comprising:
a box containing a reel and the enclosure box assembly of claim 4;
a tray containing the enclosure box and the backplate; and
wherein the fiber optic drop cable is wound on the reel.

15. The enclosure box install kit of claim 14, further comprising a cover configured to cover the tray to contain the enclosure box and the backplate in the tray.

16. An enclosure assembly for fiber optic cable comprising:
an enclosure configured to have an interior that is configured to house a preterminated fiber optic drop cable preinstalled with the enclosure and a fiber optic adapter preinstalled within the enclosure and optically connected with the fiber optic drop cable;
a backplate configured to be attached to a support structure and to be coupled with the enclosure;
wherein the enclosure is configured to prevent access to the fiber optic adapter, the predetermined end of the fiber optic drop cable, and the portion of the fiber optic drop cable that are in the interior of the enclosure when the backplate is installed to the support structure and to the enclosure;
wherein the backplate includes a plurality of latches that extend into the interior of the enclosure and are configured to interlock with a complementary latching structure on the enclosure to secure the enclosure to the backplate after the backplate is attached to the support structure; and
wherein the location of the latches in the interior of the enclosure prevents the latches from being accessible when the latches are interlocked with the complementary latching structure such that the latches and the complementary latching structure are configured to prevent the enclosure from being removed from the backplate when being attached thereto.

17. An enclosure install kit comprising:
a box containing a reel and the enclosure box assembly of claim 16;
a tray containing the enclosure and the backplate; and
wherein the fiber optic drop cable is wound on the reel.

18. The enclosure box assembly of claim 4, wherein the backplate is configured as a planar member having a top edge, a bottom edge, and two opposed side edges; and
wherein the plurality of latches are configured to extend from a front surface of the planar member inward of the top edge, the bottom edge, and the two opposed side edges into the interior of the enclosure box.

19. The enclosure box assembly of claim 4, wherein the inward location of the latches prevents the latches from being accessible when the latches are interlocked with the latching structure such that the latches and the complementary latching structure are configured to prevent the enclosure box from being removed from the backplate once attached thereto.

20. The enclosure assembly of claim 16, wherein the backplate is configured as a planar member having a top edge, a bottom edge, and two opposed side edges; and
wherein the plurality of latches are configured to extend from a front surface of the planar member inward of the top edge, the bottom edge, and the two opposed side edges into the interior of the enclosure.

21. The enclosure assembly of claim 16, wherein the inward location of the latches prevents the latches from being accessible when the latches are interlocked with the latching structure such that the latches and the complementary latching structure are configured to prevent the enclosure from being removed from the backplate once attached thereto.

22. The enclosure assembly of claim 16, wherein the enclosure is configured to be coupled with the backplate without twisting or turning the enclosure relative to the backplate to assemble the enclosure assembly.

23. The enclosure assembly of claim 16, wherein the latches are configured as cantilevered arms that extend from a front surface of the backplate and include a finger at the free end of the arms.

24. The enclosure assembly of claim 16, wherein the enclosure is a small customer terminal.

25. The enclosure assembly of claim 16, wherein at least one opening permits a drop cable to pass between the enclosure and the backplate when the enclosure is attached to the backplate and secured via the latches.

26. The enclosure assembly of claim 16, wherein the enclosure includes a front wall, a bottom wall, a top wall, two side walls, and a back wall configured to define the interior of the enclosure.

27. The enclosure assembly of claim 26, wherein the front wall, the bottom wall, the top wall, the two side walls, and the back wall are a monolithic structure of unitary construction such that the front wall is not removable from the bottom wall, the top wall, the two side walls, and the back wall.

28. The enclosure assembly of claim 16, wherein the enclosure includes first and second wrap guides arranged to direct slack of the fiber optic cable to follow an arcuate path that is greater than or equal to a minimum bend radius of the fiber optic cable.

29. The enclosure assembly of claim 16, wherein a front surface of the backplate includes a pair of opposed contoured walls formed by raised ribs extending from the front surface of the backplate on opposite sides of a first opening of the at least one opening and extending from the top end of the backplate to the bottom end of the backplate.

30. The enclosure assembly of claim 29, wherein the walls converge toward one another but are spaced apart from one another at the top end and the bottom end of the backplate to define two additional openings of the at least one opening.

* * * * *